United States Patent
Loce et al.

(10) Patent No.: US 7,170,644 B2
(45) Date of Patent: Jan. 30, 2007

(54) METHOD AND SYSTEM FOR REDUCING DISTORTION IN SCANNED IMAGES

(75) Inventors: Robert P. Loce, Webster, NY (US); Beilei Xu, Penfield, NY (US); Jason Repko, West Middlesex, PA (US)

(73) Assignee: Xerox Corporation, Stamford, CT (US)

( * ) Notice: Subject to any disclaimer, the term of this patent is extended or adjusted under 35 U.S.C. 154(b) by 1069 days.

(21) Appl. No.: 10/231,220

(22) Filed: Aug. 30, 2002

(65) Prior Publication Data

US 2004/0042678 A1 Mar. 4, 2004

(51) Int. Cl.
- H04N 1/401 (2006.01)
- H04N 1/409 (2006.01)
- H04N 1/047 (2006.01)
- G06T 3/00 (2006.01)
- G06T 5/00 (2006.01)

(52) U.S. Cl. ............ 358/3.26; 358/406; 358/463; 382/255; 382/275; 382/293

(58) Field of Classification Search .......... 358/3.26, 358/406, 448, 463, 493, 474, 471, 255, 256; 382/284, 286, 293, 295, 275, 212

See application file for complete search history.

(56) References Cited

U.S. PATENT DOCUMENTS

| | | | |
|---|---|---|---|
| 5,084,611 A | | 1/1992 | Okisu et al. |
| 5,276,530 A | * | 1/1994 | Siegel ................. 358/406 |
| 5,497,235 A | | 3/1996 | Bell |
| 5,585,926 A | | 12/1996 | Fujii et al. ............. 358/471 |
| 5,940,544 A | * | 8/1999 | Nako .................. 382/293 |
| 6,014,470 A | | 1/2000 | Matsuda ............... 382/275 |
| 6,148,120 A | * | 11/2000 | Sussman ............... 382/293 |
| 6,330,050 B1 | * | 12/2001 | Takahashi et al. ........ 355/47 |
| 6,763,141 B2 | * | 7/2004 | Xu et al. ............... 382/255 |
| 6,816,624 B1 | * | 11/2004 | Ebisawa et al. ......... 382/275 |
| 6,975,352 B2 | * | 12/2005 | Seeger et al. .......... 382/284 |

* cited by examiner

*Primary Examiner*—Scott A. Rogers
(74) *Attorney, Agent, or Firm*—Oliff & Berridge, PLC

(57) ABSTRACT

Methods and systems for dewarping images allow a user to reduce distortion in scanned images. A scanned image is processed using an optics model and an illumination model, and resampled to reduce distortion. The dewarping may be improved through iterative operations where a model parameter is varied. An optimal image is obtained which corresponds to a maximum metric as a measure of the quality of a resampled image.

29 Claims, 12 Drawing Sheets

METHOD AND SYSTEM FOR REDUCING DISTORTION IN SCANNED IMAGES

BACKGROUND OF THE INVENTION

1. Field of Invention

This invention relates to methods and systems for reducing distortion in scanned images.

2. Description of Related Art

Distortion in scanned images is well known. For example, when book pages are scanned, the resulting digital images usually contain some geometric distortion or warping. This distortion is caused by book pages not being in uniform intimate contact with the scanning surface or platen surface of a scanner. For example, portions of book pages that are near the binding of the book are usually the portions that are not in intimate contact with the platen surface. Accordingly, distortion occurs in image parts corresponding to these portions.

Specialized scanners with height sensors have been suggested to achieve distortion-free scanning. For example, U.S. Pat. No. 5,659,404 discloses an image reading apparatus which reads document surface of an open-book-like document placed on a document platen in a face-upward condition and detects height of the document. U.S. Pat. Nos. 5,855,926, 5,969,829, 6,014,470 and 6,041,146 disclose similar apparatus. These apparatus are suggested largely to prevent image distortion from occurring.

Correction methods have also been developed to correct skew in scanned images with distortion. For example, U.S. Pat. No. 5,497,236 discloses a method and apparatus for correcting for splay. U.S. Pat. No. 5,187,753 discloses a method and apparatus for identifying and correcting for document skew.

SUMMARY OF THE INVENTION

However, the correction methods mentioned above rely on estimates of text rows as an image texture. The inventors have determined that such reliance is problematic because text is not always present throughout a page of interest; text-row methods have limitations in accuracy; and text-row methods can be computationally costly. Accordingly, there exists a need for methods that compensate for and/or reduce such geometric distortions that use other image features.

This invention provides systems and methods that allow a user to reduce distortion in scanned images.

This invention separately provides systems and methods that allow a user to use an optical model to reduce distortion in scanned images.

This invention additionally provides systems and methods that allow a user to use an illumination model to reduce distortion in scanned images.

This invention separately provides systems and methods that allow a user to use a page curvature model to reduce distortion in scanned images.

This invention separately provides systems and methods that allow a user to use an iterative process to reduce distortion in scanned images.

This invention separately provides systems and methods that allow a user to use a metric from a resampled image to reduce distortion in scanned images.

This invention additionally provides systems and methods that allow a user to use a metric from a resampled image in dewarping a distorted image.

Various exemplary embodiments of systems and methods according to this invention reduce distortion in scanned images. The systems and methods of the invention may be used in any of a wide variety of devices, including, for example, copiers, scanners and digital cameras.

In various exemplary embodiments of systems and methods according to this invention, an image to be dewarped is obtained so that a user may obtain illumination data as a function of pixel position. Further, the user may obtain defocus data as a function of pixel position, according to an illumination model, and dewarping factor data as a function of pixel position, according to an optics model. Thereafter, the user may resample the image according to the dewarping factor data to reduce distortion in the image.

In various exemplary embodiments of systems and methods according to this invention, the user may improve the reduction of distortion in the scanned image by varying one or more model parameters, iterating the dewarping process according to the varied one or more model parameters, measuring a quality metric of the resampled image after each dewarping process, and obtaining a desired resampled image according to an appropriate metric.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

Figure 1:
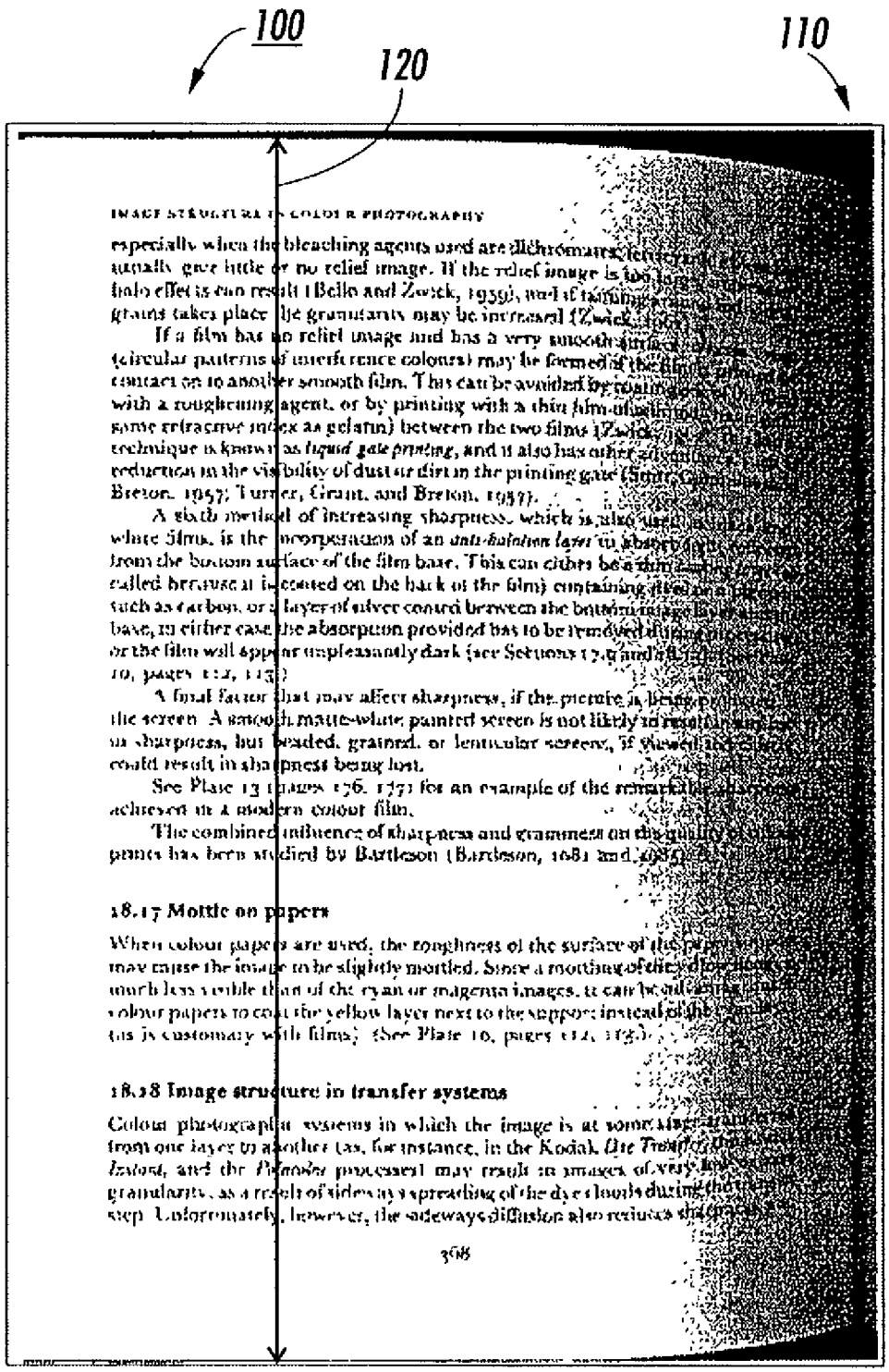
FIG. 1 shows a scanned image having distortion.

FIG. 1 shows an image 100 of a page of a bound book scanned using a scanner. The lines of the text are distorted near the binding edge 110 on the right-hand side of the image 100. This is because the page was not in uniform intimate contact with the platen surface of the scanner when the page was scanned. When being scanned, the left-hand side of the page was in intimate contact with the platen surface of the scanner, while the right-hand side of the page was a defocus distance from the platen surface because the binding of the book prevented the portion of the right-hand side of the page from being placed into intimate contact with the platen surface. As a result, the left-hand side of the image 100, which corresponds to the left-hand side of the page, is not distorted. On the other hand, the right-hand side of the image 100, which corresponds to the right-hand side of the page, is distorted. As shown in FIG. 1, the width 120 of the image 100 decreases as the text lines approach the binding edge 110.

Figure 2:
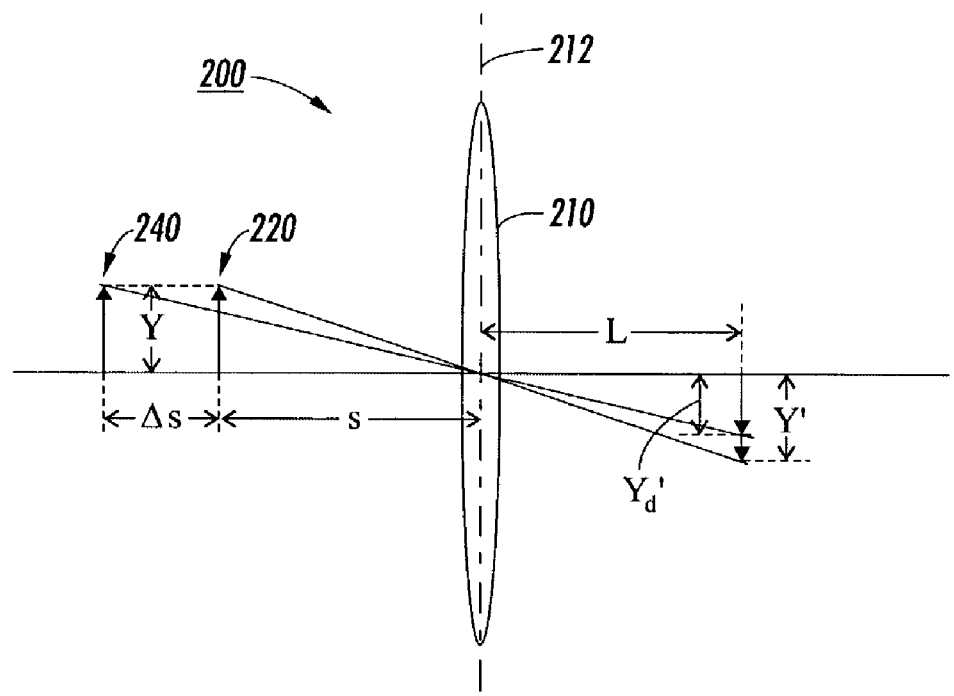
FIG. 2 illustrates one exemplary embodiment of an optics model according to this invention.

FIG. 2 illustrates one exemplary embodiment of an optics model 200 according to this invention. The optics model 200 illustrates how a defocus distance from a platen surface affects the width Y' of the scanned image 100. As shown in FIG. 2, a platen 220 is at a nominal focus distance s from a principal plane 212 of a lens 210. An image having a fixed width Y is placed on the platen surface at the platen 220 to form an image on an image sensor having an image plane 230. The image plane 230 is at a sensor distance L from the principal plane 212 of the lens 210. When the page is in intimate contact with the surface of the platen 220, the distance between the page and the principal plane of the lens 210 is therefore also s. Therefore, s is a nominal object distance for the page. Accordingly, the image formed on the sensor at the image plane 230 has a nominal image width Y'. Therefore, the nominal magnification ratio M:

$$M = Y'/Y \quad (1)$$

When a portion of the page, such as a portion near a binding of a book, is displaced from the platen surface 220, this portion 240 of the page is spaced away from the platen 220 a distance $\Delta s$, in a direction away from the principal plane 212 of the lens 210. Although this portion 240 of the page has the same page width Y, the image of this portion 240 of the book 220, when formed at the image plane 230 of the sensor, has a decreased image width $Y'_d$. Therefore the defocus magnification ratio $M_d$ between the width of the image on the page Y and the width of the scanned image $Y'_d$ is:

$$M_d = Y'_d/Y \quad (2)$$

Accordingly, the magnification ratio $M_r$ of the defocus magnification $M_d$ to the nominal magnification M is:

$$M_r = M_d/M = \frac{Y'_d/Y}{Y'/Y}. \quad (3)$$

Figure 3:
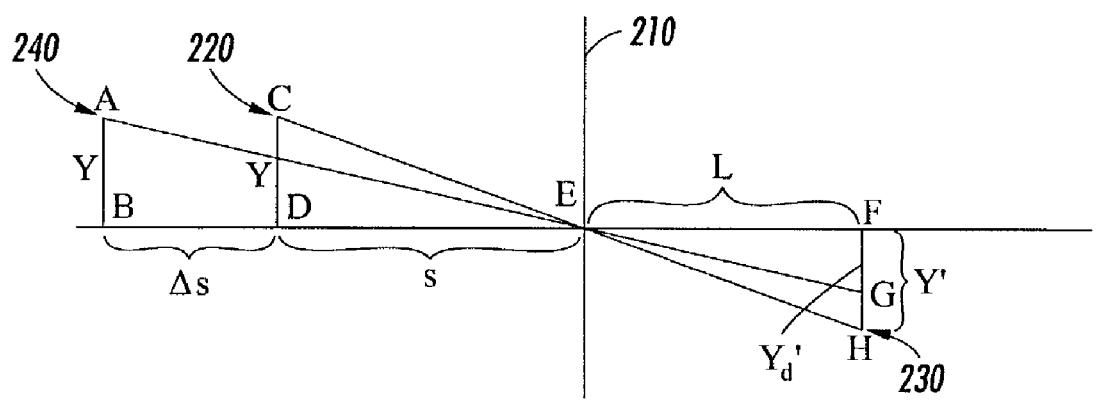
FIG. 3 illustrates the optical geometry of the optics model shown in FIG. 2.

FIG. 3 illustrates the optical geometry of the optics model 200 shown in FIG. 2. A comparison between FIGS. 2 and 3 indicates:

$$\overline{AB} = Y, \quad (4)$$

$$\overline{CD} = Y, \quad (5)$$

$$\overline{BE} = s + \Delta s, \quad (6)$$

$$\overline{DE} = s, \quad (7)$$

$$\overline{FE} = L, \quad (8)$$

$$\overline{FG} = Y'_d, \text{ and} \quad (9)$$

$$\overline{FH} = Y'. \quad (10)$$

Also, FIG. 3 indicates that triangle $\Delta ABE$ is similar to triangle $\Delta FGE$.

Therefore:

$$\overline{FG}/\overline{AB} = \overline{FE}/\overline{BE}. \quad (11)$$

In view of Eqs. (4), (6), (8) and (9), Eq. (11) leads to:

$$\frac{Y'_d}{Y} = \frac{L}{s + \Delta s}. \quad (12)$$

Similarly, in FIG. 3, triangle $\Delta CDE$ is similar to triangle $\Delta FHE$. Thus:

$$\overline{FH}/\overline{CD} = \overline{FE}/\overline{DE}. \quad (13)$$

In view of Eqs. (5), (7), (8) and (10), the following can be derived from Eq. (13):

$$\frac{Y'}{Y} = \frac{L}{s}. \quad (14)$$

Furthermore, combining Eqs. (3), (12) and (14) provides:

$$M_r = M_d/M = \frac{Y'_d}{Y'} = \frac{s}{s + \Delta s}. \quad (15)$$

In Eq. (15), s is a parameter of the optical system 200. Thus, if the nominal distance s between the platen 220 and the principal plane 212 of the lens 210 is known, Eq. (15) can be used to determine the magnification ratio $M_r$ for each defocus distance $\Delta s$. On the other hand, if the nominal distance s between the platen and the principal plane of the lens 220 is not known, the nominal distance s between the platen and the principal plane of the lens 220 s can be determined through a calibration process. In the calibration process, a fixed-sized object at two known defocus distances $\Delta s_1$ and $\Delta s_2$ can be scanned to form two images. The ratio of the widths $Y'_{d1}$, and $Y'_{d2}$ of the two images can be used in combination with the difference between the two defocus distances $\Delta s_1$ and $\Delta s_2$ to solve for the nominal distance s between the platen 220 and the principal plane 212 of the lens 210 using Eq. (15).

Eq. (15) may be used to reduce distortion and/or to dewarp distorted images. Because a distortion in the scanned image involves varying or nonuniform magnification of the width of a page across the length of that page due to a changing defocus distance $\Delta s$, once the defocus distance $\Delta s$ is known for any given region of the page, the ratio of the widths $Y'_d$ and $Y'$ can be determined using Eq. (15). The ratio of the widths is then used in resampling the distorted images to reduce the distortion in the scanned image.

The inventors have discovered that the defocus distance $\Delta s$ can be estimated from a measurement of a feature, such as illumination or reflectance, in the scanned image. For example, an illumination model may be employed to obtain a relationship between an illumination i and the defocus distance $\Delta s$. In one exemplary embodiment of an illumination model according to this invention, the illumination i falls off exponentially as the defocus distance $\Delta s$ increases, as described below.

Figure 4:
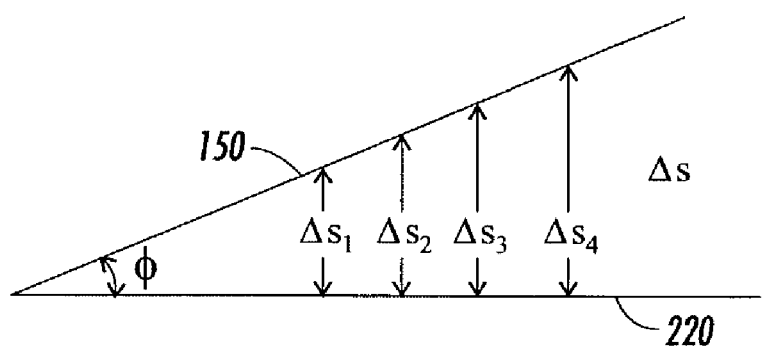
FIG. 4 illustrates one exemplary embodiment of a calibration model according to this invention.

In various exemplary embodiments, before use, the illumination model is calibrated and/or established. FIG. 4 illustrates one exemplary embodiment of an illumination calibration model according to this invention usable to establish the illumination model according to this invention. As shown in FIG. 4, a uniform calibration target image 150 is set at an angle θ or a slope relative to the surface of the platen 220 so that the defocus distance $\Delta s$ changes as a known function of the distance x along the scanned image. Illumination or reflectance is measured for various defocus distances.

Figure 5:
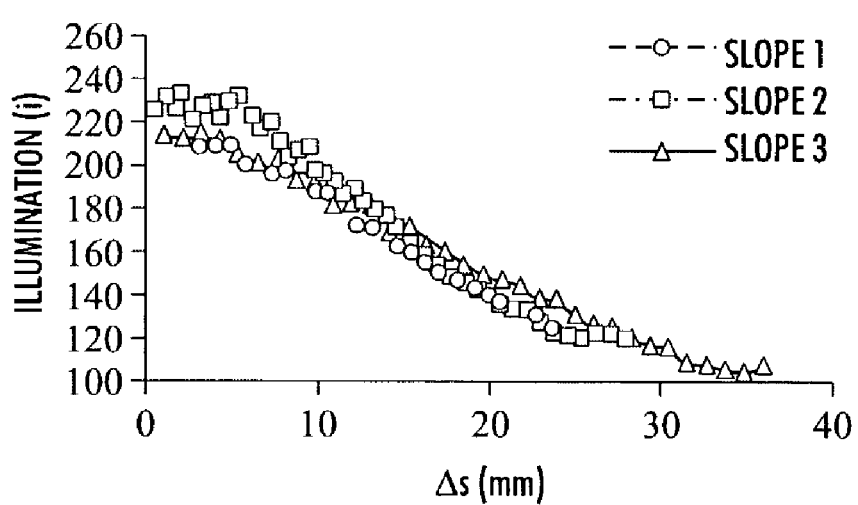
FIG. 5 shows exemplary test results of illumination data distributed over different defocus distances using different calibration slopes.

FIG. 5 is a plot of measured illumination data obtained using the technique illustrated in FIG. 4. Generally, for an image carried on a page bound in a book, the defocus distance $\Delta s$ increases towards the binding of the book. Accordingly, illumination falls off near the binding. To reduce random variation in illumination measured using the calibration model shown in FIG. 4, several points at the same distance along the length of the scanned image can be used to obtain an average illumination for a specific defocus distance $\Delta s$ corresponding to that distance along the length of the scanned image.

In a book binding setting, there may be several parameters that affect illumination level or illumination, the most important being distance, angle, geometry of gap, and proximity to the book edge. For a reasonable approximation, the inventors have found that illumination level is primarily controlled by the distance. The inventors have found a strong correlation between defocus distance $\Delta s$ and illumination level. Thus, it is reasonable to construct a model of defocus distance versus illumination level.

In FIG. 5, for example, the relationship between the illumination i and the defocus distance $\Delta s$ was obtained when the uniform test target 150 was set at three different slopes relative to the platen surface. As shown in FIG. 5, the illumination i varies little with slope. That is, the differences in the slopes have little effect on the general relationship between the illumination i and the defocus distance $\Delta s$.

Accordingly, in various exemplary embodiments of methods and systems according to this invention, the illumination model uses the defocus distance $\Delta s$ as the only factor that determines illumination variation. However, it should be appreciated that the other parameters could be used in a model, especially under certain circumstances where illumination level alone is insufficient.

In various exemplary embodiments of methods and systems according to this invention, the relationship between the illumination i and the defocus distance $\Delta s$ shown in FIG. 5 is used to establish and/or calibrate the illumination model. In various exemplary embodiments of methods and systems according to this invention, the illumination model takes the form of a mathematical equation. In various other exemplary embodiments of methods and systems according to this invention, the illumination model takes the form of a look-up table constructed with a smoothness criteria defined by a low pass filter.

For example, one exemplary embodiment of the illumination model takes the form of an exponential equation:

$$\Delta s = \ln(c_1/i)/c_2, \qquad (16)$$

where:

$\Delta s$ is defocus distance;

i is the illumination; and $c_1$ and $c_2$ are two normalized constants.

The constants $c_1$ and $c_2$ can be determined through a functional fit, as discussed in greater detail below in connection with FIG. 6.

Figure 6:
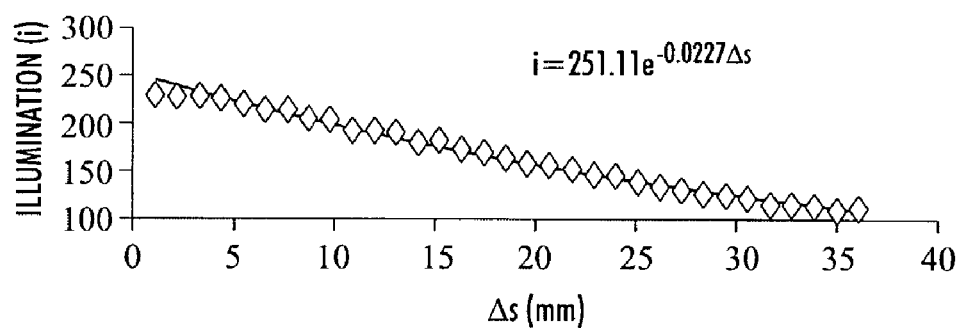
FIG. 6 illustrates one exemplary fit of observed illumination data to an illumination model according to this invention.

FIG. 6 shows an example of a functional fit between the measured illumination values i and the defocus distance $\Delta s$ as defined by Eq. (16). The plotted points represent illumination values i measured at various known defocus distances $\Delta s$. The line fitted to these points, as shown in FIG. 6, has values for the constants $c_1$ and $c_2$ of 251.11 and 0.0227, respectively.

For ease of description, it is assumed that an image is scanned using a conventional document scanner with a flat glass platen, with conventional optics and an image sensor, such as a continued scan charge coupled device (CCD) array. Also, it is assumed that a book is scanned with the binding parallel to one dimension of the sensor array. However, it should be appreciated that a book can be placed in any other orientation and scanned in different ways without departing from the scope and spirit of this invention.

Furthermore, the pages of a book can be scanned in different orders. The pages can be scanned one after another, one page at a time. The pages can also be scanned such that two facing pages are scanned together, resulting in two scanned images, one for each of the two facing pages. In this situation, the left and right scanned images are treated separately and the two scanned images can be segmented from the single set of scanned illumination values by splitting the single set of scanned illumination values into the two images according to a dark column, corresponding to the binding, between the two images.

Once the scanned image is obtained, illumination data can be measured to obtain the relationship between illumination and defocus distance, such as the relationship expressed in Eq. (16).

In one exemplary embodiment, an image is viewed as an array of pixels, with each column parallel to the binding and each row perpendicular to the binding. In various exemplary embodiments, for each pixel column, illumination data can be measured as disclosed in U.S. patent application Ser. No. 09/750,568, which is incorporated herein by reference in its entirety.

In the incorporated 568 application, foreground pixels and background pixels are defined for a scanned image. For a scanned text image with black text lines and white background, for example, the foreground pixels are pixels associated with the black text lines and the background pixels are pixels associated with the white background margins. The illumination data of the foreground pixels and the background pixels are measured. Also, the distribution of the foreground pixel illumination data and the distribution of the background pixel illumination data are used to determine illumination values of pixels corresponding to regions of the input image that are in intimate contact with the platen surface and illumination values of darkened pixels corresponding to regions of the input image that are near the binding of the page carrying the input image. Furthermore, illumination compensation values are derived, and image pixel data is compensated or scaled to lighten up the darkened pixels corresponding to regions of the input image that are near the binding of the page carrying the input image.

The illumination measuring method disclosed in the incorporated 568 application is used to establish a relationship between the illumination i and pixel position x. The pixel position x is defined as the distance between a pixel column and the left-hand side boundary of the scanned image. The pixel position x increases as it moves away from the left-hand side boundary and approaches the "binding" that appears in the scanned image. The method of lightening the darkened portions disclosed in the incorporated 568 application may also be used, as will be discussed in greater detail below.

Figure 7:
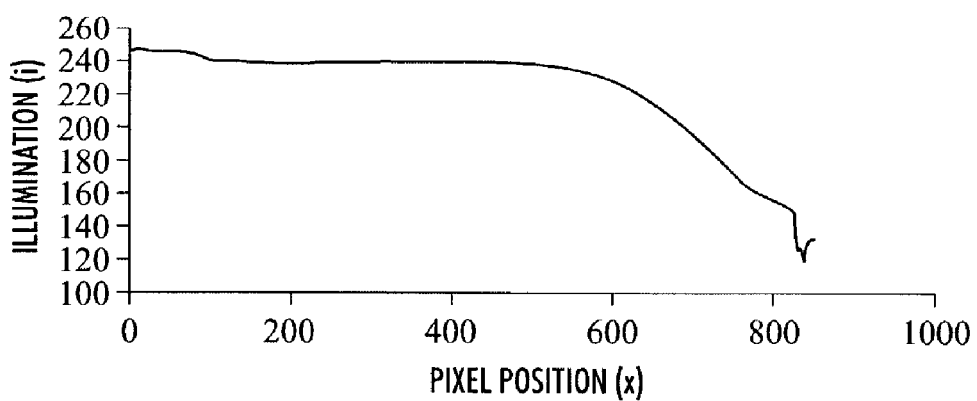
FIG. 7 illustrates one exemplary embodiment of a relationship between illumination and pixel position, determined from a scanned image according to this invention.

FIG. 7 illustrates one exemplary embodiment of a relationship between the illumination values i and the pixel position x, which was obtained by applying the illumination measuring method disclosed in the incorporated 568 application to the image 100 shown in FIG. 1. As can be inferred from FIG. 7, during the scanning process, the portion of the page corresponding to the region of the input image between the pixel position x=0 and the pixel position x=600 is generally in intimate contact with the surface of the platen 220. This is evident because illumination i is high and constant for these pixel positions. Beginning at about the pixel position x=600, the illumination i falls off between the pixel positions x=600 and x=800. Thus, the defocus $\Delta s$ distance begins to increase from 0 at about the pixel position x=600 and increases as the pixel position increases to x=800.

Figure 8:
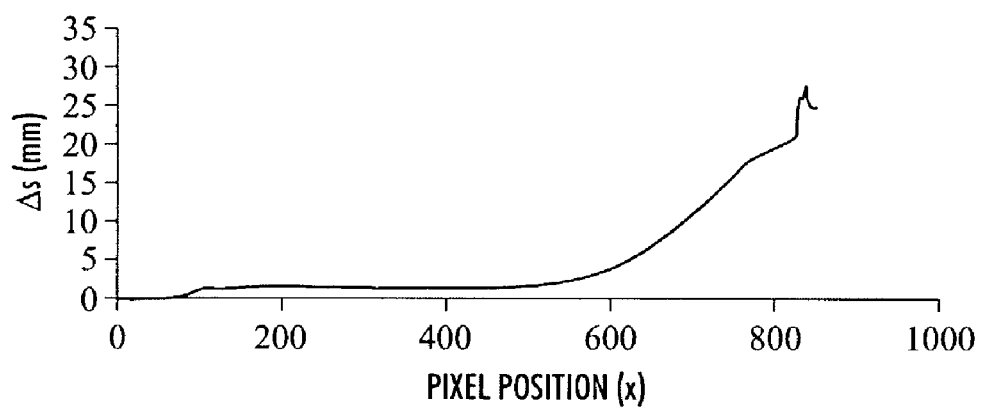
FIG. 8 illustrates one exemplary embodiment of a relationship between defocus distance and pixel position, based on an illumination model according to this invention.

From the relationship between the illumination values i and the pixel position x shown in FIG. 7, the relationship between the defocus distance $\Delta s$ and the pixel position x can be estimated using the illumination model of Eq. (16). FIG. 8 shows such an estimate obtained by applying Eq. (16) to the relationships between the illumination i and the position pixel x shown in FIG. 7 and the illumination i and defocus distance $\Delta s$ shown in FIG. 6. As shown in FIG. 8, the defocus distance $\Delta s$ is generally small between the pixel positions x=0 and x=600. The defocus distance $\Delta s$ is slightly non-zero before the pixel position x=600, begins increasing at the pixel position x=600 and increases rapidly as the pixel distance x increases to x=800, as discussed above in connection with FIG. 7.

The estimated defocus distance $\Delta s$ at each pixel position, as shown in FIG. 8, can be used to determine the magnification ratio $M_r$ at the different pixel positions x, using the optics model of Eq. (15). Based on this determined magnification ratio $M_r$, a dewarping factor D can be determined. The dewarping factor D is defined as the inverse of the magnification ratio $M_r$:

$$D=1/M_r=(s+\Delta s)/s. \tag{17}$$

Figure 9:
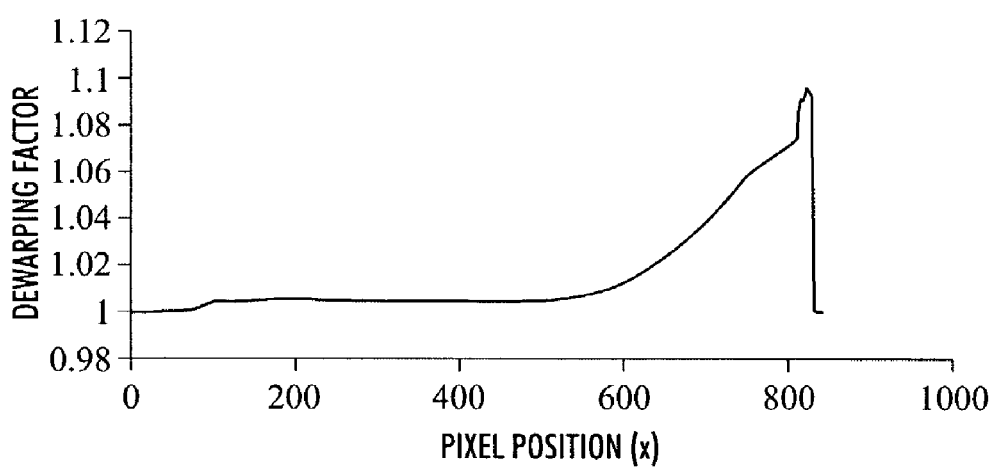
FIG. 9 illustrates one exemplary relationship between a dewarping factor and pixel position, based on an optics model according to this invention.

FIG. 9 illustrates an exemplary embodiment of a relationship between the dewarping factor D and the pixel position x, obtained from the data shown in FIG. 8. Based on the dewarping factors D shown in FIG. 9, for each pixel position x, the scanned image shown in FIG. 1 can be locally scaled and resampled to produce a compensated image that reduces warping. Also, the illumination may be compensated for at a pixel scale to lighten up the darkened portions near the binding, using the illumination compensation method disclosed in the incorporated 568 application, as discussed above.

In various exemplary embodiments of methods and systems according to this invention, when the scanned image is locally scaled and resampled, each pixel in the scanned image is magnified according to the dewarping factor. The magnification is two-dimensional, and the pixel is magnified both in the direction that is parallel to the book binding, and in the direction that is perpendicular to the book binding. Accordingly, the resampling stretches and widens the scanned image in the direction that is perpendicular to the book binding. At the same time, the resampling straightens the text lines near the book binding in the direction that is parallel to the book binding.

Figure 10:
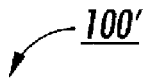
FIG. 10 illustrates one exemplary embodiment of the image shown in FIG. 1 after dewarping and resampling according to this invention.

FIG. 10 shows one exemplary embodiment of a modified image 100' that has been created by dewarping and/or compensating for the separation of the page from the surface of the platen 220 of FIG. 1. As shown in FIG. 10, the text lines of the modified image 100' are now substantially straight and have a constant width Y, and the darkened portion near the binding has been lightened.

In various exemplary embodiments, the relationship between dewarping factor D and the pixel position x shown in FIG. 9 can be fit to a functional form to better represent a smooth monotonic behavior expected from the page curvature. In these exemplary embodiments, a page curvature model F(x) is used:

$$F(x)=\exp(x/a)/b, \tag{18}$$

where:

x is the pixel position; and a and b are parameters that can be determined from data to create an exponential fit to the dewarping factor value D shown in FIG. 9.

Using the page curvature model F(x) shown in Eq. (18) is optional. The page curvature model is used when needed to represent a smooth, monotonic behavior expected from page curvature and/or when the parameters a and/or b are used in optimization, which will be disclosed in greater detail below. Nevertheless, determining the dewarping factor D used in resampling a scanned image can be directly made from FIG. 9, independent of Eq. (18).

Although the dewarping procedure described above is presented in separate steps for clarity of description, it should be appreciated that these steps can be combined without departing from the scope and spirit of this invention.

In one exemplary embodiment of the systems and methods according to this invention, a dewarping process is improved by optimization. In this embodiment, a metric is defined to measure the quality of a resampled/dewarped image. An iterative or parallel process is used to maximize the quality metric.

In such an optimization process, one or more model parameters are chosen. In various exemplary embodiments, the parameter a of the page curvature model of Eq. (18) may be chosen; the parameter b of the page curvature model may be chosen, and/or other parameters, such as the parameters $c_1$ or $c_2$ of Eq. (16) or the nominal focus distance s of Eq. (15) or any combination of any of the parameters in Eqs. (15), (16) and/or (18) may be chosen.

As used herein, the terms "optimize", "optimal" and "optimization" connote a condition where one entity is deemed better than another entity because the difference between the two entities is greater than a desired difference. It should be appreciated that it would always be possible to determine a better entity as the desired difference decreases toward zero. Also, the terms "maximize", "maximum" and "maximization" connote a condition where one entity is deemed greater than another entity because the difference between the two entities is greater than a desired difference. It should be appreciated that it would always be possible to determine a greater entity as the desired difference decreases toward zero. Similarly, the terms "minimize" and "minimal" connote a condition where one entity is deemed less than another entity because the difference between the two entities is greater than a desired difference. Again, it should be appreciated that it would always be possible to determine a lesser entity as the desired difference approaches zero.

Accordingly, it should be appreciated that, these terms are not intended to describe an ultimate or absolute condition. Rather, it should be appreciated that these terms are intended to describe a condition that is relative to a desired level of accuracy represented by the magnitude of the desired difference between two or more entities. In various embodiments of systems and methods according to this invention, when approaching a result that is optimal, it is satisfactory to stop at a result with a desired result, without having to reach the optimal result. In various other embodiments of systems and methods according to this invention, when approaching a result that is maximum, it is satisfactory to stop at a result with a desired result, without having to reach the maximum result.

A parameter chosen for optimization may be given a range and a step size. The parameter is stepped through the range based on the step size. For each step, a dewarping process is completed, a resampled image is generated and a metric that measures the quality of the resampled image is determined. The process continues until the metric is maximized.

For example, when the parameter a of Eq. (18) is chosen for optimization, the parameter a is varied within a predetermined range of values with a predefined step size. For each value of the parameter a, the corresponding value of the parameter b is determined, as is done in the process of fitting Eq. (18). A dewarping process is completed for this pair of parameter values for a and b, producing a resampled image. A metric is determined for this resampled image resulted from using this pair of parameter values for the parameters a and b. Then, a next pair of parameter values for the parameters a and b is used, a new resampled image is produced and another metric is determined. The process continues until the metric is maximized. The pair of parameter values for the parameters a and b associated with the maximum metric is used in a final dewarping process, producing a final resampled image as an optimal result.

In various exemplary embodiments, the metric is defined in a way similar to that disclosed in U.S. Pat. No. 5,187,753, which is incorporated herein by reference in its entirety. In the 753 patent, skew, rather than distortion, is determined. In the process disclosed in the 753 patent, the number of black/dark pixels (ON pixels) is summed for each row of pixels. Then, a variance in the number of black pixels among the lines (rows) is determined. Different variances are determined for different angles of image orientation. Skew is identified when the variance is a maximum.

In various exemplary embodiments according to this invention, the concept of variance is used as a metric in optimization. Similar to what is disclosed in the 753 patent, the variance is summed from each row of pixels. However, different from the disclosure of the 753 patent, different variances are obtained for different values of the particular parameters chosen for optimization, not for different angles.

Figure 11:
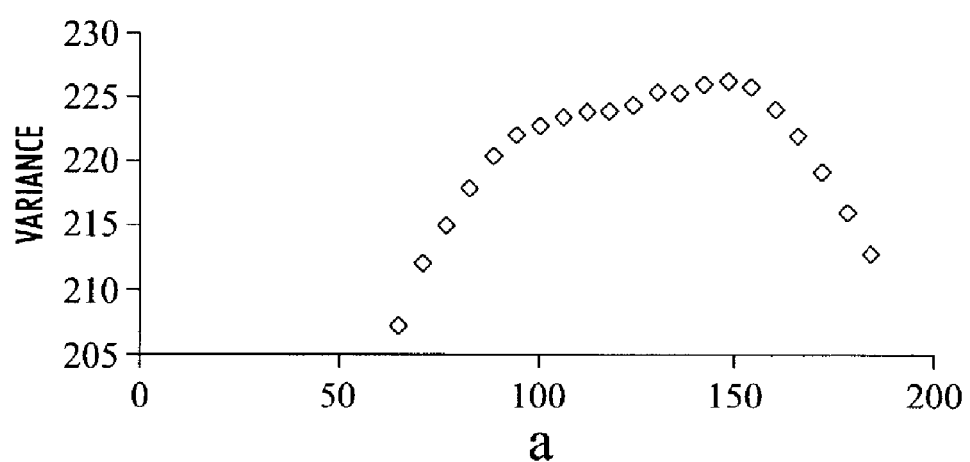
FIG. 11 illustrates one exemplary embodiment of a relationship between a quality metric and the value of a parameter of a model according to this invention.

FIG. 11 illustrates an exemplary embodiment of a relationship between variance and the parameter a of Eq. (18). As shown in FIG. 11, the parameter a of Eq. (18) is chosen, and is varied over the range of values of 50 and 200. Different variances result from different values of the parameter a. As can be seen in FIG. 11, the variance reaches a maximum when the value of the parameter a is about 150. Therefore, this parameter a and its corresponding parameter b may be used in a final version of the page curvature model for resampling the image to produce an optimal result.

In various exemplary embodiments, a chosen parameter for optimization may be stepped through the whole span of a predefined range to locate the maximum variance. The chosen parameter may also be stepped through only part of the span of the predetermined range. In this case, stepping the value of the chosen parameter stops when a maximum variance is identified, without having to step through the remainder of the span of the predetermined range. In this situation, the maximum variance can be identified when the variance corresponding to a current step is less, by a predetermined amount, than the variance corresponding to a previous step obtained when stepping through the span of the predetermined range. Of course, it should be appreciated that this assumes that there is only one maximum variance.

In various exemplary embodiments, only top and bottom portions of the scanned image 100 are used to determine the metric. This improves the sensitivity of the metric, because the scanned image is more severely distorted at the top and bottom portions of the scanned image. Also, in various exemplary embodiments, different metrics are obtained for the left and right hand sides of the scanned image, to achieve a balance between the two sides. Optimization is achieved when both metrics at the left and right hand sides are maximized under the condition that both metrics at the left and right hand sides are substantially equal to each other.

Figure 12:
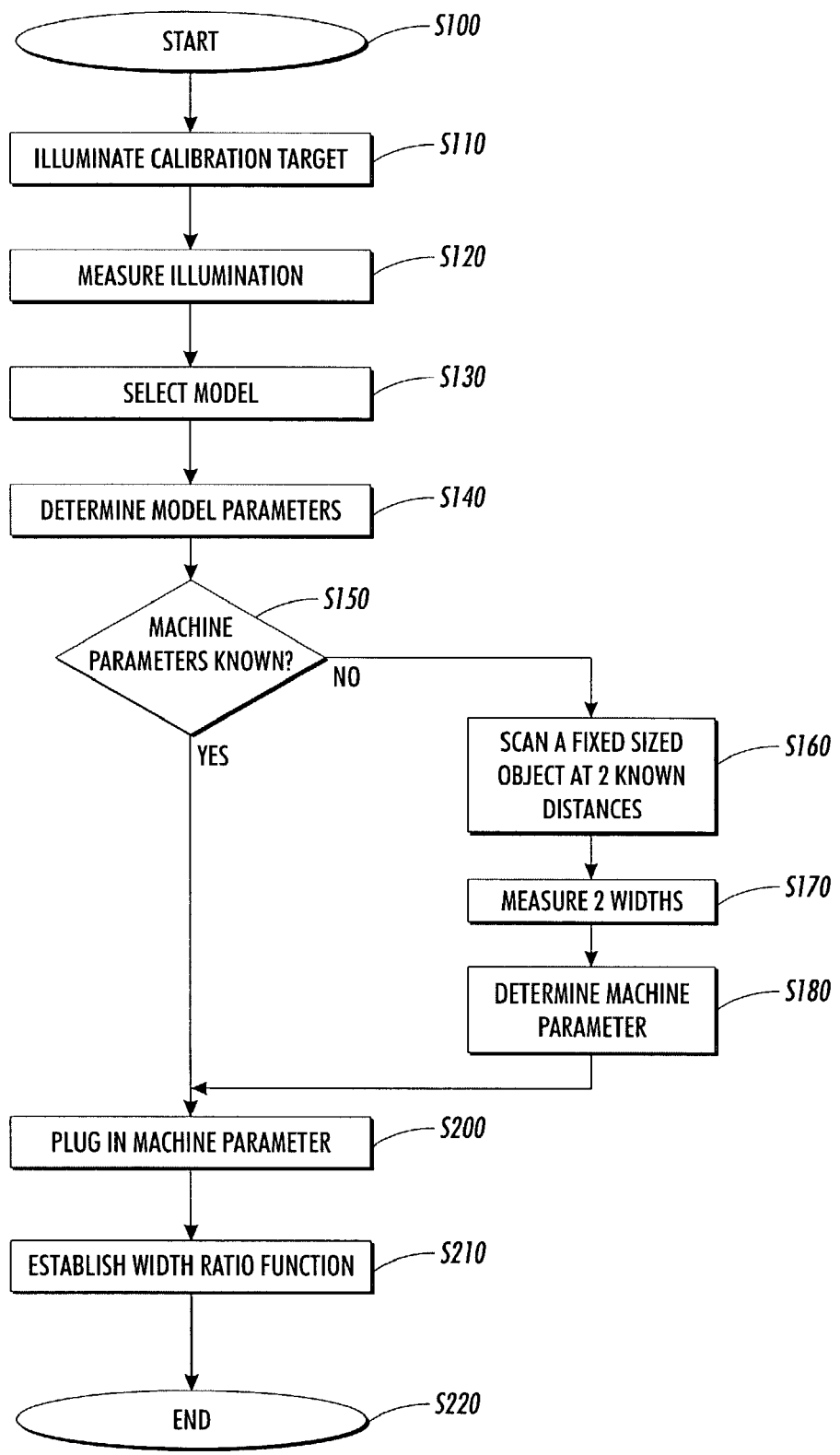
FIG. 12 is a flowchart outlining an exemplary embodiment of a calibration process in accordance with this invention.

FIG. 12 is a flowchart outlining one exemplary embodiment of a method for establishing an optics model according to Eq. (15) and/or an illumination model according to Eq. (16).

As shown in FIG. 12, beginning in step S100, operation of the method continues to step S110, where a uniform test target for calibration, such as that shown in FIG. 4, is illuminated. Then, in step S120, illumination data are measured at different defocus distances. Next, in step S130, a form of the illumination model, such as a exponential expression, is selected. Operation then continues to step S140. Of course, if the form of the illumination model has previously been selected, step S130 can be omitted.

In step S140, parameters of the selected model form are determined according to the measured illumination data. Thus, the illumination model of the relationship between illumination and defocus distance is established. Next, in step S150, a determination is made whether the nominal focus distance s is known. If so, operation jumps directly to step S200. Otherwise, operation proceeds to step S160.

In step S160, a fixed-size object is scanned at the platen surface 220 to obtain a first scanned image with a width Y' (see FIG. 2). The fixed-sized object is also scanned at a defocus distance $\Delta s$ from the platen surface 220 to obtain a second scanned image with width $Y'_d$. Then, in step S170, the widths of the two scanned images Y' and $Y'_d$ are measured. Next, in step S180, the nominal focus distance s is determined, using Eq. (15) with the known defocus distance Δs and the corresponding measured values for the widths Y' and Y'$_d$. Thereafter, operation proceeds to step S200.

In step S200, the nominal focus distance s is plugged into Eq. (15). Next, in step S210, an optics model relating the magnification ratio M$_r$ and the defocus distance Δs is determined. Thereafter, operation continues to step S220, where operation of the method ends.

It should be appreciated that, in FIG. 12, the first group of steps (steps S110–S140) and the second group of steps (steps S150–S210) are independent of each other. Accordingly, these two groups can appear in the flowchart in any order. That is, the calibration of the illumination model and the calibration of the optics model can be performed independently from each other.

Figure 13:
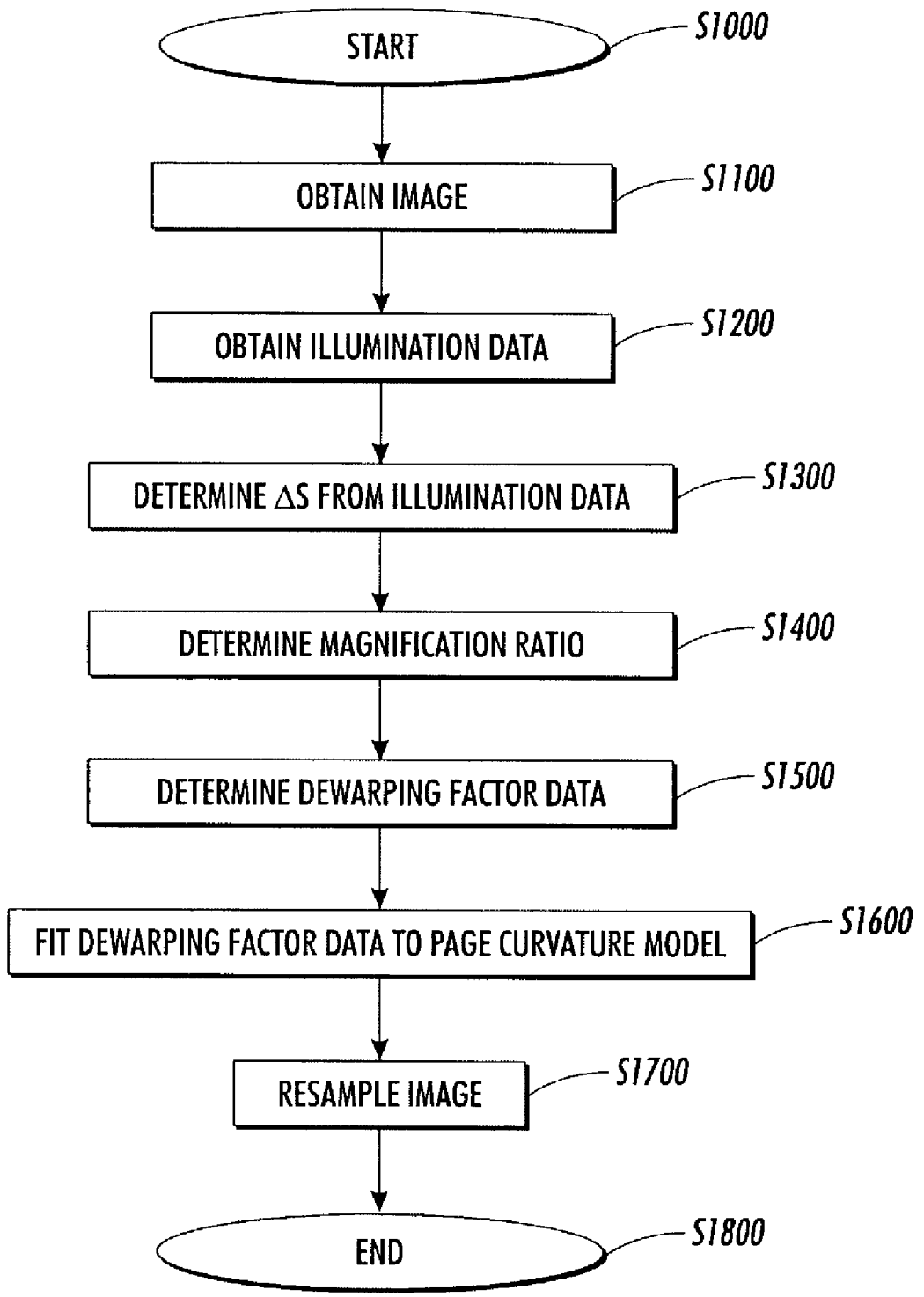
FIG. 13 is a flowchart outlining an exemplary embodiment of a method for reducing distortion in scanned images in accordance with this invention.

FIG. 13 is a flowchart outlining one exemplary embodiment of a method for reducing distortion in scanned images. As shown in FIG. 13, beginning in step S1000, operation of the method continues to step S1100, where a scanned image is obtained. Then, in step S1200, illumination data is obtained as a function of pixel position x. An example of such a data distribution is shown in FIG. 7. Next, in step S1300, the illumination data is applied to the illumination model of Eq. (16) to define the defocus distance Δs as a function of the pixel position x. An example of such a relationship is shown in FIG. 8. Operation then continues to step S1400.

In step S1400, the defocus distance Δs is applied to the optics model of Eq. (15) to obtain the magnification ratio M$_r$. Next, in step S1500, the magnification ratio M$_r$ is converted into the dewarping factor D, as a function of the pixel position x. An example of the dewarping factor D as a function of the pixel position x is shown in FIG. 9. Then, in step S1600, the dewarping factor D is fit to a page curvature model. In step S1700, the scanned image is resampled using the determined dewarping factor D. The dewarping factor D can be obtained either in step S1500, or from the smoothed page curvature obtained in step S1600. Thereafter, operation continues to step S1800, where operation of the method ends.

As discussed above in connection with Eq. (18), step S1600 is optional. It should be appreciated that step S1600 is performed when it is desirable to obtain a smooth, monotonic page curvature model, or when the parameter a or b is needed in an optimization process, which will be discussed in greater detail below.

Figure 14:
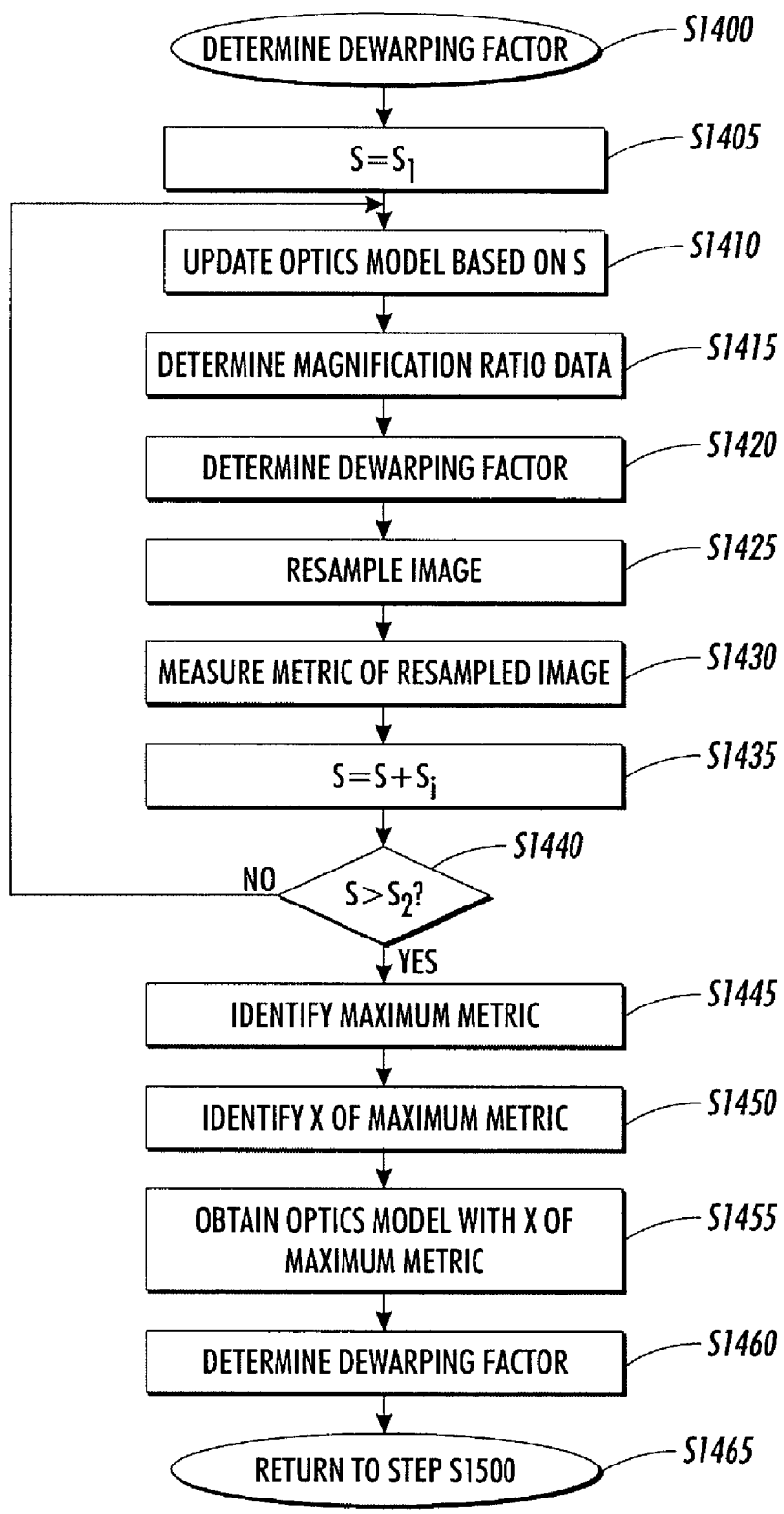
FIG. 14 is a flowchart outlining in greater detail an exemplary embodiment of the method for determining a dewarping factor according to this invention.

FIG. 14 is a flowchart outlining in greater detail one exemplary embodiment of a method for determining the dewarping factor D of step S1400 using an alternative process.

As shown in FIG. 14, beginning in step S1400, operation continues to step S1405, where the nominal focus distance s is set to an initial value s$_1$. Then, in step S1410, the optics model defined by Eq. (15) is updated based on the current value of the nominal focus distance s. Next, in step S1415, the magnification ratio is determined based on the updated optics model defined by Eq. (15). Operation then continues to step S1420.

In step S1420, a current dewarping factor D is determined from the magnification ratio. Next, in step S1425, the scanned image is resampled, according to the determined current dewarping factor D. Then, in step S1430, a metric of the resampled image is measured and recorded in association with the current value of the nominal focus distance s. Operation then continues to step S1435.

In step S1435, the current value of the nominal focus distance s is increased by a focus distance increment s$_i$. Then, in step S1440, a determination is made whether the value of the nominal focus distance s is greater than the value of a final focus distance s$_2$. If not, the nominal focus distance s has not stepped through the whole range between the initial and final focus distances s$_1$ and s$_2$. Accordingly, operation returns to step S1410. Otherwise, operation proceeds to step S1445.

In step S1445, a maximum metric is identified. Next, in step S1450, the value of the nominal focus distance s associated with the maximum metric is identified. Then, in step S1455, the optics model defined in Eq. (3) is further updated with the value of the nominal focus distance s that is associated with the maximum metric to produce an optimal optics model. Next, in step S1460, the determined optimal dewarping factor D is determined according to the determined optimal optics model. Operation then continues to step S1465, where operation returns to step S1500.

It should be appreciated that, in step S1445, once a maximum metric is identified, the resampled image associated with the maximum metric may be identified as the optimal resampled image and operation of the method may end there.

Figure 15:
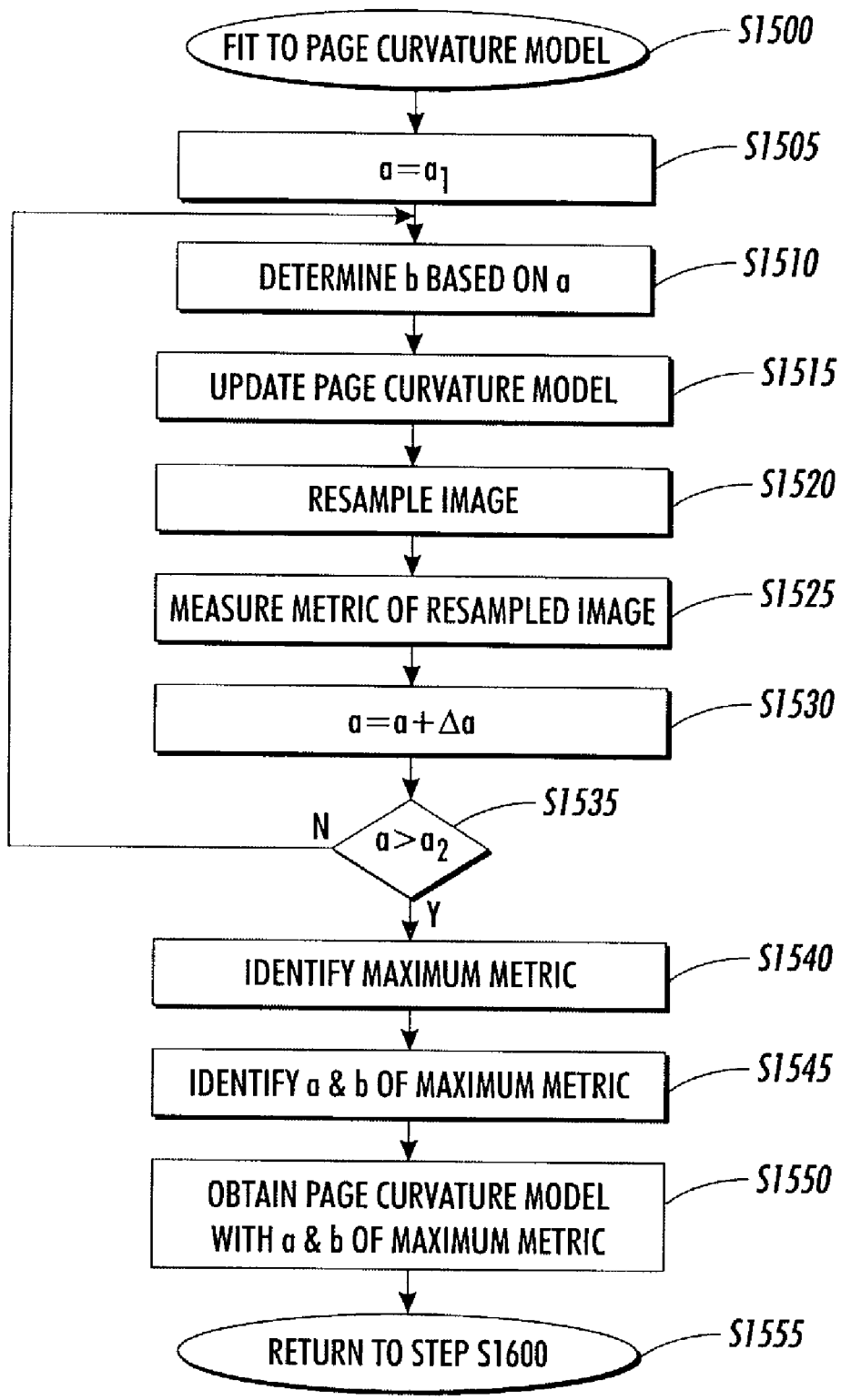
FIG. 15 is a flowchart outlining in greater detail an exemplary embodiment of the method for fitting dewarping factor data to the page curvature model in accordance with this invention.

FIG. 15 is a flowchart outlining in greater detail one exemplary embodiment of the method for fitting dewarping factor data to a page curvature model of step S1500. As shown in FIG. 15, beginning in step S1500, operation continues to step S1505, where the parameter a is set to an initial value a$_1$. In various exemplary embodiments, in step S1500, the parameter a steps through the span of a range between a$_1$ and a$_2$ with a step size of Δa. Here, a$_1$ and a$_2$ are two parameters defining the range.

Then, in step S1510, the current value of the second parameter b is set to an initial value b$_1$. This value of the second parameter b$_1$ would produce a best fit of the function of page curvature model with the dewarping factor data D, in view of the current value of the first parameter a. Next, in step S1515, the page curvature model defined by Eq. (18) is updated based on the current values of the first and second parameters a and b. Operation then continues to step S1520.

In step S1520, the scanned image is resampled according to the dewarping factor D from the updated page curvature model defined by Eq. (18). Next, in step S1525, a metric is measured and recorded for the resampled image. This metric is associated with the current values of the first and second parameters a and b. Then, in step S1530, the current value of the first parameter a is increased by Δa. Operation then continues to step S1535.

In step S1535, a determination is made whether the current value of the first parameter a is greater than a final value of the first parameter a$_2$. If not, operation returns to step S1510. Otherwise, operation proceeds to step S1540.

In step S1540, a maximum metric is identified from the recorded metrics. Then, in step S1545 the values of the first and second parameters a and b associated with the maximum metric are identified. Next, in step S1550, the page curvature model defined by Eq. (18) is updated using the values of the first and second parameters a and b associated with the maximum metric to produce the optimal page curvature model. Then, operation continues to step S1555, where operation returns to step S1600.

It should be appreciated that, in step 1540, once the maximum metric is identified, the resampled image associated with the maximum metric may be identified as the optimal resampled image and operation of the method may end there.

Figure 16:
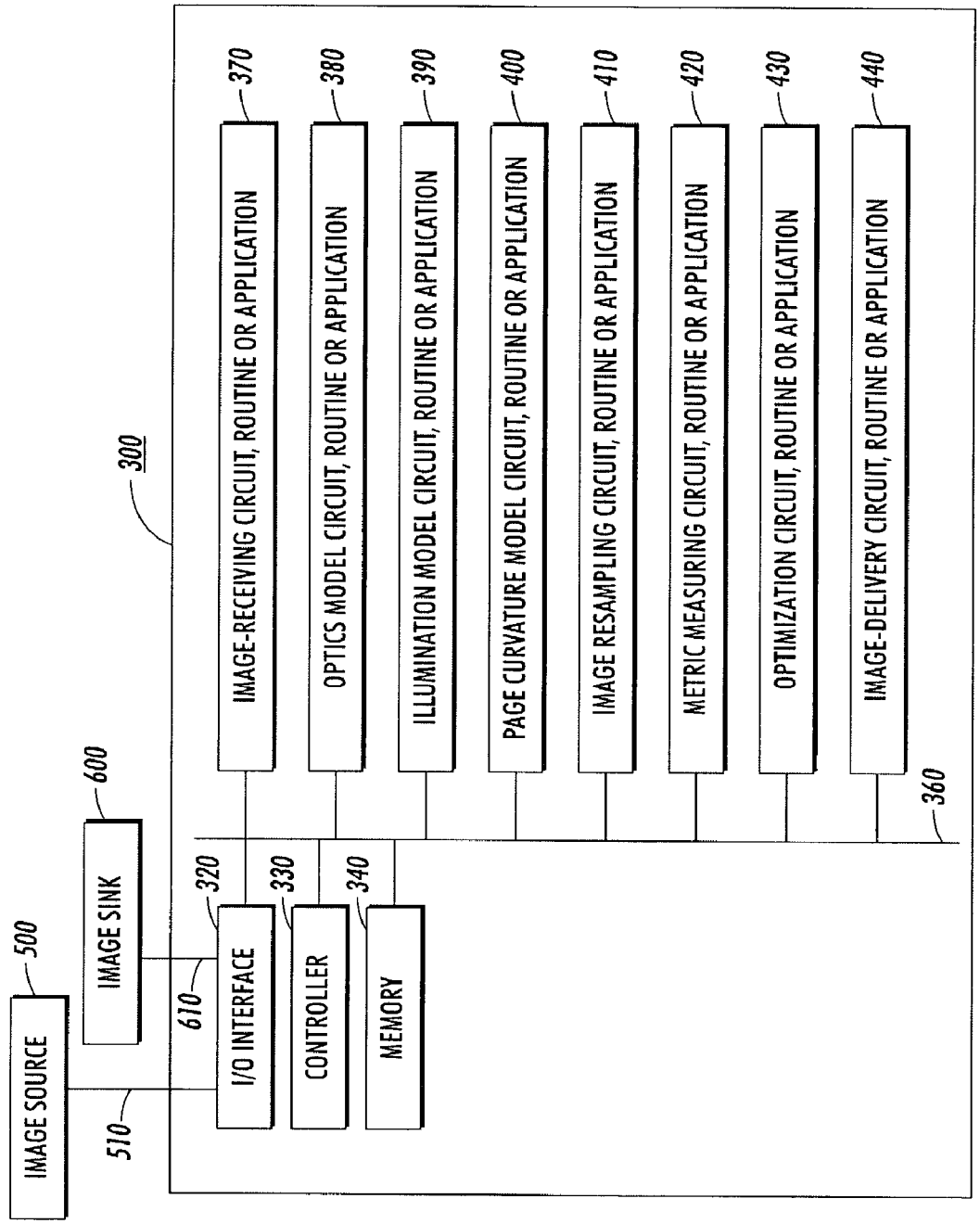
FIG. 16 is a functional block diagram of one exemplary embodiment of a dewarping system according to this invention.

FIG. 16 is a block diagram outlining one exemplary embodiment of an image dewarping system 300 according to this invention. As shown in FIG. 16, the dewarping system 300 comprises one or more of an I/O interface 320, a controller 330, a memory 340, an image-receiving circuit, routine or application 370, an optics model circuit, routine or application 380, an illumination model circuit, routine or application 390, a page curvature model circuit, routine or application 400, an image-resampling circuit, routine or application 410, a metric measuring circuit, routine or application 420, an optimization circuit, routine or application 430, and an image-delivery circuit, routine or application 440, each interconnected by one or more control and/or data buses and/or one or more application programming interfaces 360. As shown in FIG. 16, the dewarping system 300 is, in various exemplary embodiments, implemented on a programmed general purpose computer. However, the dewarping system 300 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 12–15, can be used to implement the dewarping system 300.

The I/O interface 320 interacts with the outside of the system. For example, the I/O interface 320 receives a scanned image from an image source 500 over a link 510. The I/O interface 320 also outputs a dewarped image to an image sink 600 over a link 610. The I/O interface 320 may include a user interface, such as an interactive screen, or the like.

As shown in FIG. 16, the memory 340 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like. The memory 340 stores information received from the I/O interface 320, such as a scanned image received by the I/O interface 320. The memory 340 also stores information and/or data from various ones of the circuits, routines or applications 370–440 of the dewarping system 300 during or at intermediate steps of a dewarping process. The memory 340 also stores dewarped image data, and/or data related to different models, such as an optics model, an illumination model and/or a page curvature model. The memory 340 also stores one or more types of metrics obtained from resampled images.

The one or more control and/or data buses and/or application programming interfaces 360 provide communication and data transfer among various circuits, routines or applications 370–440 of the dewarping system 300. The controller 330 provides instructions to various ones of the circuits, routines or applications 370–440 of the dewarping system 300.

In the dewarping system 300 shown in FIG. 16, the image-receiving circuit, routine or application 370 receives image data from the I/O interface 320. The optics model circuit, routine or application 380 calibrates the optics model and uses the optics model to determine the magnification ratio $M_r$ from the defocus data $\Delta s$. The illumination model circuit, routine or application 390 calibrates the illumination model and uses the illumination model to determine the defocus distances $\Delta s$ from the illumination data. The page curvature model circuit, routine or application 400 fits dewarping factor data to the page curvature model and uses the page curvature model to determine the dewarping factor D. The image-resampling circuit, routine or application 410 resamples images based on the determined dewarping factor D. The metric measuring circuit, routine or application 420 measures a metric, such as variance, from the resampled image. The optimization circuit, routine or application 430 steps a model parameter through a range and identifies a maximum value for this metric. The image-delivery circuit, routine and application 440 delivers a resampled image to the image sink 600 through the I/O interface 320 and over the link 610.

The image source 500 can be any one of a number of different sources, such as a digital copier, a facsimile device, a digital camera, a scanner, or a locally or remotely located computer, or any other known or later-developed device that is capable of generating electronic image data. Similarly, the image source 500 can be any suitable device that stores and/or transmits electronic image data, such as a client or a server of a network, or the Internet, and especially the World Wide Web. In various exemplary embodiments, the image source 500 can be integrated with the I/O interface 320, as in a digital copier having an integrated scanner. In various other exemplary embodiments, the image source 500 can be connected to the I/O interface 320 over a connection device, such as a modem, a local area network, a wide area network, an intranet, the Internet, any other distributed processing network, or any other known or later-developed connection device.

It should also be appreciated that, while the electronic image data can be generated at the time of printing an image from an original physical document, the electronic image data could have been generated at any time in the past. The image source 500 is thus any known or later-developed device which is capable of supplying electronic image data to the I/O interface 320. For example, the image source 500 may be a data carrier such as a magnetic storage disk, CD-ROM or the like, or a host computer that contains scanned image data. Thus, the image source 500 can be any known or later-developed source that is capable of providing image data to the dewarping system 300 according to this invention. Similarly, the image sink 600 can be any known or later-developed device that is capable of receiving the dewarped image data output by the dewarping system 300 and either storing, transmitting, or displaying the dewarped image data.

In an exemplary embodiment of an operation according to this invention, the dewarping system 300 receives an image from the image source 500. The image may be a pre-stored image or an instantly scanned image. The image is received by the I/O interface 320, and stored into the memory 340.

The illumination model circuit, routine or application 390, under control of the controller 330, determines illumination data from the image and determines defocus distance data based on the determined illumination data, using an illumination model. The illumination model circuit, routine or application 390, under control of the controller 330, also calibrates the illumination model when needed (i.e., when a user requests such a calibration, or a calibration has not been performed before). The optics model circuit, routine or application 380, under control of the controller 330, determines magnification ratio based on the determined defocus distance data, using an optics model. The optics model circuit, routine or application 380, under control of the controller 330, further determines dewarping factor data based on the determined magnification ratio. The optics model circuit, routine or application 380 also calibrates the optics model when needed (i.e., when the nominal focus distance is unknown).

The page curvature model circuit, routine or application 400, under control of the controller 330, best fits the determined dewarping factor data to a page curvature model. The page curvature model circuit, routine or application 400, under control of the controller 330, further determines smoothed dewarping factor data, using the page curvature model. The image-resampling circuit, routine or application 410, under control of the controller 330, resamples the image based on the smoothed dewarping factor data. The image-delivery circuit, routine or application 440, under control of the controller 330, delivers the resampled image to the image sink 600 through the I/O interface 320.

When a user desires an optimization process, the controller 330 instructs the metric measuring circuit, routine or application 420 and the optimization circuit, routine or application 430 to measure metric and to step a model parameter, respectively. For example, when a user desires to improve reduction of distribution in a scanned image by iteration of the nominal focus distance, the optimization circuit, routine or application 430, under control of the controller 330, steps the nominal focus distance s through a range. For each current value of the nominal focus distance s, the optics model circuit, routine or application 380, under control of the controller 330, updates the optics model.

In this example, accordingly, the optics model circuit, routine or application 380, under control of the controller 330, determines the magnification ratio based on the updated optics model, and determines the dewarping factor data from the magnification ratio. The page curvature model circuit, routine or application 400, under control of the controller 330, fits the dewarping factor data to the page curvature model and determines smoothed dewarping factor data from the page curvature model. The image-resampling circuit, routine or application 410, under control of the controller 330, resamples the image based on the smoothed dewarping factor data. The metric measuring circuit, routine or application 420, under control of the controller 330, measures a metric of the resampled image for the current value of the nominal focus distance s. The optimization circuit, routine or application 430, under control of the controller 330, then identifies a maximum metric and associated nominal focus distance s and/or resampled image.

Also, for example, when the user desires to improve reduction of distortion in the scanned image by iteration of the parameter a of the page curvature model, the optimization circuit, routine or application 430, under control of the controller 330, steps the parameter a of the page curvature model through a range. For each current value of the parameter a of the page curvature model, the optimizational circuit, routine or application 430, under control of the controller 330, determines a current value of the parameter b of the page curvature model.

In this example, accordingly, the page curvature model circuit, routine or application 430, under control of the controller 330, updates the page curvature model. The page curvature model circuit, routine or application 400, under control of the controller 330, determines the smoothed dewarping factor data from the updated page curvature model. The image resampling circuit, routine or application 410, under control of the controller 330, resamples the image based on the smoothed dewarping factor data. The metric measuring circuit, routine or application 420, under control of the controller 330, measures a metric of the resampled image. The optimization circuit, routine or application 430, under control of the controller 330, identifies a maximum metric and associated parameters a and b of the page curvature model and/or associated resampled image.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of reducing distortion in a scanned image having illumination data, comprising:
   determining defocus distance data according to the illumination data;
   determining dewarping factor data according to the defocus distance data; and
   resampling the image according to the dewarping factor data.

2. The method of claim 1, wherein determining defocus distance data comprises determining defocus distance data according to the illumination data from an illumination model.

3. The method of claim 2, wherein the illumination model relates defocus distance to an illumination data and one or more parameters.

4. The method of claim 2, wherein the illumination model is:

$$\Delta s = \ln(c_1/i)/c_2,$$

where:
   $\Delta s$ is a defocus distance;
   $i$ is the illumination data; and
   $c_1$ and $c_2$ are parameters.

5. The method of claim 2, further comprising calibrating the illumination model.

6. The method of claim 5, wherein calibrating the illumination model comprises:
   measuring calibration illumination data at a plurality of defocus points from a uniform calibration target; and
   determining one or more parameters according to the calibration illumination data.

7. The method of claim 3, wherein determining the defocus distance data comprises:
   stepping one of the one or more parameters through a range to obtain metrics; and
   determining a desired metric from the metrics.

8. The method of claim 7, further comprising:
   determining a value of one of the one or more parameters associated with the desired metric;
   determining a desired illumination model by using the value of the one of the one or more parameters associated with the desired metric; and
   determining the defocus distance data according to the illumination data from the desired illumination model.

9. The method of claim 7, wherein stepping one of the one or more parameters comprises:
   a. selecting a first value for one of the one or more parameters as a current value of the one of the one or more parameters;

b. updating the illumination model based on the current values of the one or more parameters;
c. determining the defocus distance data according to the illumination data from the updated illumination model;
d. determining dewarping factor data according to the determined defocus distance data;
e. resampling the image according to the determined dewarping factor data;
f. determining a metric according to the resampled image;
g. changing the current value of one of the one or more parameters; and
h. repeating the steps b–g until the current value of the one of the one or more parameters is no longer within the range.

10. The method of claim 1, wherein determining the dewarping factor data comprises determining the dewarping factor data according to the defocus distance data from an optics model.

11. The method of claim 10, wherein the optical model relates the dewarping factor to the defocus distance and a parameter.

12. The method of claim 10, wherein the optics model is:

$$D = \frac{s + \Delta s}{s},$$

where:
D is the dewarping factor;
Δs is the defocus distance; and
s is a parameter.

13. The method of claim 11, further comprising:
determining whether the parameter is known; and
calibrating the optics model if the parameter is not known.

14. The method of 13, wherein calibrating the optics model comprises:
measuring illumination of an object having a known size at two distances; and
determining the parameter according to the measured illumination at the two distances.

15. The method of 11, wherein determining the dewarping factor data comprises:
stepping the nominal parameter through a range to obtain metrics; and
determining a desired metric from the metrics.

16. The method of claim 15, further comprising:
determining a value of the parameter associated with the desired metric;
determining a desired optics model by using the value of the parameter associated with the desired metric; and
determining the dewarping factor data according to the defocus distance data from the desired optics model.

17. The method of claim 15, wherein stepping the parameter comprising:
a. selecting a first value for the parameter as a current value of the parameter;
b. updating the optics model based on the current value of the parameter;
c. determining the dewarping factor data according to the defocus distance data from the updated optics model;
d. resampling the image according to the determined dewarping factor;
e. determining a metric according to the resampled image;
f. changing the current value of the parameter; and
g. repeating steps b–f until the current value of the parameter is no longer within the range.

18. The method of claim 1, further comprising fitting the dewarping factor data to a page curvature model.

19. The method of claim 18, wherein the page curvature model relates the dewarping factor to a pixel position and one or more parameters.

20. The method of claim 18, wherein the page curvature model is:

$$F(x) = \exp(x/a)/b,$$

where:
F(x) is the dewarping factor;
x is a pixel position; and
a and b are parameters.

21. The method of claim 19, wherein fitting the dewarping factor data comprises:
stepping one of the one or more parameters through a range to obtain metrics; and
determining a desired metric from the metrics.

22. The method of claim 21, further comprising:
determining a value of one of the one or more parameters associated with the desired metric;
determining a desired page curvature model by using the value of the one or more parameters associated with the desired metrics; and
determining the dewarping factor data according to the defocus distance data using the desired page curvature model.

23. The method of claim 21, wherein stepping one of the one or more parameters comprising:
a. selecting a first value for one of the one or more parameters as a current value of the one of the one or more parameters;
b. updating the page curvature model based on the current values of the one or more parameters;
c. determining the dewarping factor data according to the defocus distance data from the updated page curvature model;
d. resampling the image according to the determined dewarping factor data;
e. determining a metric according to the resampled image;
f. changing the current value of one of one or more parameters; and
g. repeating steps b–f until the current value of the one of one or more parameters is no longer within the range.

24. The method of claim 1, further comprising determining the illumination data.

25. A system for dewarping an image having illumination data, comprising:
a controller;
a database;
an optics model circuit, routine or application;
an illumination model circuit, routine or application; and
an image-resampling circuit, routine or application;
wherein:
the illumination model circuit, routine or application determines defocus distance data from the illumination data,
the optics model circuit, routine or application determines dewarping factor data based on the determined defocus distance data, and
the image-resampling circuit, routine or application resamples the image based on the determined dewarping factor data.

26. The system of claim 25, wherein the optics model circuit, routine or application further calibrates at least one optics model.

27. The system of claim 25, wherein the illumination model circuit, routine or application further calibrates at least one illumination model.

28. The system of claim 25, further comprising a page curvature model circuit, routine or application, wherein the page curvature model circuit, routine or application fits the dewarping factor data to a page curvature model and the page curvature model determines smoothed dewarping factor data.

29. The system of claim 25, further comprising:
a metric measuring circuit, routine or application; and
an optimization circuit, routine or application;

wherein:
the optimization circuit, routine or application steps a parameter of a model through a range, and updates the model based on a current value of the parameter at each step,
the metric measuring circuit, routine or application determines metrics for resampled images, each resampled image resampled based on the update model at each step, and
the optimization circuit, routine or application further identifies a desired metric from the determined metrics.

* * * * *